United States Patent [19]
Wiegard

[11] 4,058,157
[45] Nov. 15, 1977

[54] BEARING SUPPORT OF THE HEAT-EXCHANGER DISK OF REGENERATIVE HEAT-EXCHANGER

[75] Inventor: Klaus Wiegard, Esslingen, Germany

[73] Assignee: Daimler-Benz Aktiengesellschaft, Germany

[21] Appl. No.: 719,237

[22] Filed: Aug. 31, 1976

Related U.S. Application Data

[62] Division of Ser. No. 531,795, Dec. 11, 1974.

[30] Foreign Application Priority Data

Dec. 12, 1973 Germany ............................ 23616979

[51] Int. Cl.² ............................................. F28D 19/00
[52] U.S. Cl. ........................................ 165/8; 267/160;
308/184 A; 308/202; 308/215
[58] Field of Search ........................... 267/160; 165/8;
152/254, 255, 256; 308/184 R, 184 A, 202, 215

[56] References Cited

U.S. PATENT DOCUMENTS

| 1,030,688 | 6/1912 | Strawn | 152/256 |
| 1,287,762 | 12/1918 | Sagen | 152/255 |
| 3,061,386 | 10/1962 | Dix et al. | 308/184 R |
| 3,392,776 | 7/1968 | Topouzian | 165/8 |
| 3,774,675 | 11/1973 | Yoshiro | 165/8 |

*Primary Examiner*—Albert W. Davis, Jr.
*Attorney, Agent, or Firm*—Craig & Antonelli

[57] ABSTRACT

A heat-exchanger disk for a regenerative heat-exchanger of a gas turbine which is secured on a rotatable support by the interposition of spring elements, the spring elements are thereby in the form of leaf spring elements series-connected with one another in the shape of a ring and interconnected at their overlapping ends; the leaf spring elements are supported under prestress with outwardly curved arcuate portions at counter surfaces provided in the central aperture of the heat-exchanger disk and with inwardly curved arcuate portions at counter surfaces of the support.

17 Claims, 4 Drawing Figures ved on the coil springs. The
BEARING SUPPORT OF THE HEAT-EXCHANGER DISK OF REGENERATIVE HEAT-EXCHANGER This is a division of application Ser. No. 531,795 filed Dec. 11, 1974.

The present invention relates to a heat-exchanger disk of a regenerative heat-exchanger of a gas turbine which is secured under interposition of spring elements on a rotatable bearer support. Such spring elements protect the heat-exchanger disk against strong vibrations and especially against the strong shocks which occur during the starting and acceleration of motor vehicle gas turbines. In addition thereto, these spring elements equalize differing thermal expansions between the ceramic heat-exchanger disk and the metallic bearing thereof.

In one prior art construction (German Offenlegungschrift 2,153,584), the spring elements of the heat-exchanger disk consist of a large number of coil springs, which are accommodated in grooves that are arranged in the longitudinal direction at the circumference of the disk shaft. Radially inserted intermediate members of essentially square shaped configuration bridge an annular space between the central cylindrical opening in the heat-exchanger disk and the shaft thereof in that they are supported respectively with one side in the opening and with the opposite side on the coil springs. The intermediate members are thereby guided in the grooves receiving the coil springs which makes necessary an accurate machining of the corresponding sliding surfaces. In order to avoid a canting of the intermediate members during the operation, the grooves must have a sufficient depth which is further increased by the space requirements of the coil springs. Since the transmission of torque between the heat-exchanger disk and the intermediate members takes place only by friction, relatively strong coil springs are necessary for producing the abutment pressure which require a corresponding large space so that altogether a great depth of the grooves results. If the shaft is not to be weakened thereby, the diameter thereof must be dimensioned unusually large. A construction with deep grooves additionally does not permit a direct arrangement of the bearing in the disk plane for space reasons. The shaft bearing support must therefore be arranged outside of the disk which leads to a further enlargement of the heat-exchanger.

The present invention is concerned with the task to avoid these disadvantages and to create a heat-exchanger disk which excels by a space-saving center bearing support of simple construction, which with a good centering and torque transmission is able to elastically absorb also strong shocks. This takes place according to the present invention by leaf spring elements series-connected to one another in the shape of a ring, which are connected with each other at their overlapping ends and which are supported under prestress with outwardly curved arcuate portions at counter surfaces in the central opening or aperture of the heat-exchanger disk and with inwardly curved arcuate portions at counter surfaces of the supports.

Such a construction allows one to be able to get along with few spring elements of simple shape which can be accommodated owing to their arcuate shape in a narrow annular space between the heat-exchanger disk and the shaft thereof. The inwardly curved arcuate portions thereby abut only at counter surfaces of the bearer support without engaging into the same so that the bearer support offers still sufficient space for the accommodation of a bearing. A very compact type of construction of an elastic center bearing support is achieved therewith.

Accordingly, it is an object of the present invention to provide a center bearing support of a heat-exchanger disk of a regeneraive heat-exchanger which avoids by simple means the aforementioned shortcomings and drawbacks encountered in the prior art.

Another object of the present invention resides in a center bearing support of a heat-exchnger disk of a regenerative heat-exchanger which not only avoids accurate machining of certain parts thereof but additionally favors the space requirements.

A further object of the present invention resides in a bearing support of the heat-exchange disk of a regenerative heat-exchanger which requires relatively little space and thus permits a compact construction utilizing simple parts.

Another object of the present invention resides in a center bearing support of a heat-exchanger disk of a regenerative heat-exchanger which permits the accommodation of the bearing inside of the heat-exchanger disk while at the same time providing a space-saving arrangement for centering the heat-exchanger disk on the shaft thereof.

Still a further object of the present invention resides in a heat-exchanger disk which is equipped with an improved space-saving center bearing support of simple construction that is capable of elastically absorbing also hard shocks combined with good centering and torque transmission.

Still another object of the present invention resides in a heat-exchanger construction of the type described above which utilizes simple spring elements for mounting the heat-exchanger disk on its shaft.

These and further objects, features, and advantages of the present invention will become more apparent from the following description when taken in connection with the accompanying drawing which shows, for purposes of illustration only, one embodiment in accordance with the present invention, and wherein.

Figure 1:
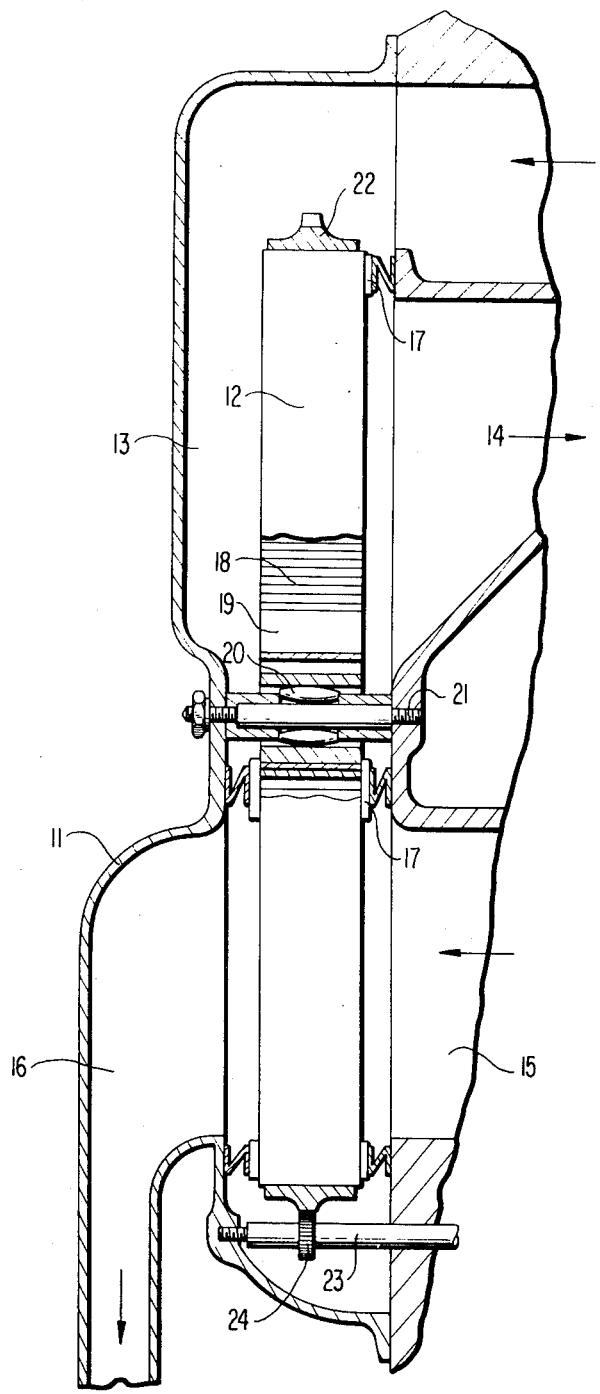
FIG. 1 is a partial longitudinal cross-sectional view through a regenerative heat-exchanger in accordance with the present invention.

Referring now to the drawing wherein like reference numerals are used throughout the various views to designate like parts, the regenerative heat-exchanger illustrated in FIG. 1 of a motor vehicle gas turbine essentially consists of a ceramic heat-exchanger disk 12 rotatably supported in a housing 11, of channels 13 and 14 for the combustion air as well as of channels 15 and 16 for the exhaust gases. Seals 17 prevent an escape of the gases out of channels 14 to 16. The heat-exchanger disk 17 consists of axial passage channels 18 and of a solid core 19. It is supported by means of a roller bearing 20 on a shaft 21 secured in the housing 11. A gear rim 22 is arranged at the circumference of the heat-exchanger disk 12 into which engages a pinion 24 secured on a shaft 23.

During the operation, the heat-exchanger disk 12 is set into rotation by way of the shaft 23 driven by the gas turbine (not shown), the pinion 24 and the gear rim 22. The hot exhaust gases of the gas turbine are conducted by way of the channel 15 into the heat-exchanger disk 12, whereby the exhaust gases flow through the channel 18 provided in the heat-exchanger disk and thereby give off heat to the heat-exchanger disk 12. The cooled-off exhaust gases leave the heat-exchanger disk 12 through the channel 16. The relatively cold combustion air supplied by the compressor (not shown) of the gas turbine flows through the channel 13 into the part of the heat-exchanger disk 12 which is heated-up by the exhaust gases and absorbs thereat heat. The heated combustion air is conducted through the channel 14 to the combustion chamber (not shown) of the gas turbine.

Figure 2:
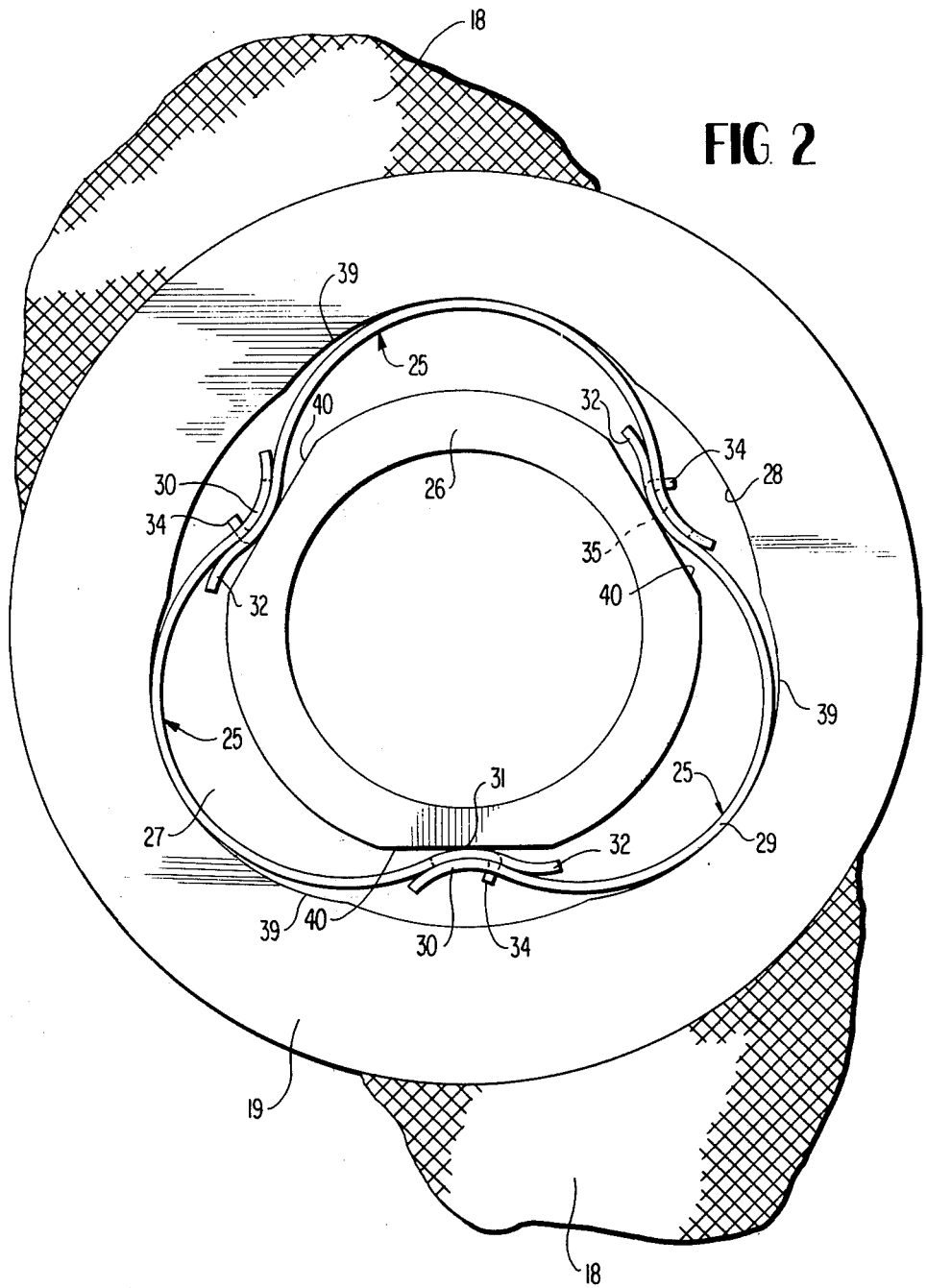
FIG. 2 is a side elevational view of the center part of the heat-exchanger disk of the heat-exchanger shown in FIG. 1, on en enlarged scale.

In order to avoid harmful effects of the shocks occurring during the operation of the gas turbine on the heat-exchanger disk 12, the heat-exchanger disk, as shown in FIG. 2, is secured on the outer race 26 of the roller bearing 20 under interposition of three leaf spring elements generally designated by reference numeral 25. The leaf spring elements are thereby so inserted under prestress into a free annular space 27 between the central opening or aperture 28 in the core 19 of the heat-exchanger disk 12 and the outer bearing race 26 of the roller bearing 20 that they form a ring whereby respectively the ends of two adjacent leaf spring elements 25 overlap.

Figure 3:
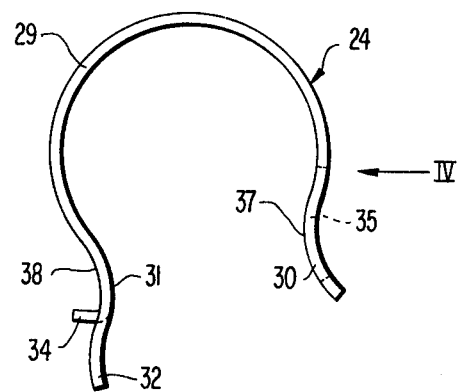
FIG. 3 is a front elevational view of a spring element in accordance with the present invention for the heat-exchanger disk of FIGS. 1 and 2, on an enlarged scale.
Figure 4:
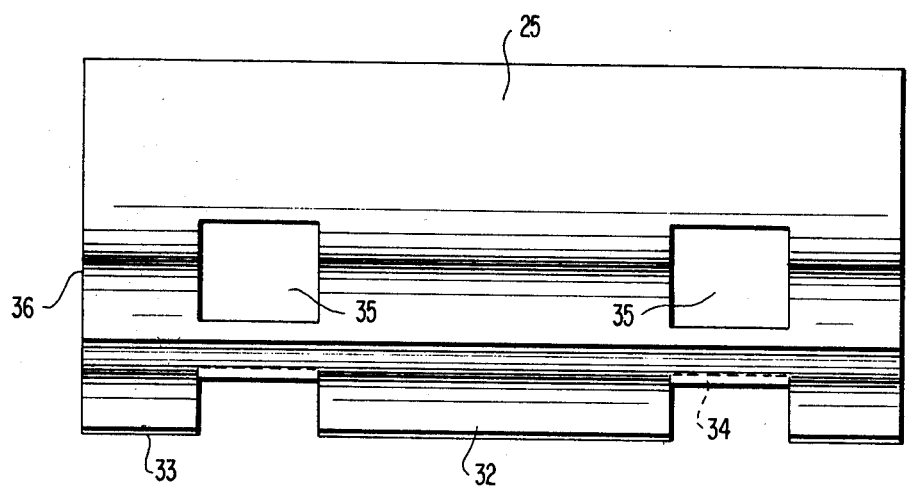
FIG. 4 is a side elevational view of the spring element of FIG. 3, taken in the direction of arrow IV of FIG. 3.

A leaf spring element 25 is illustrated in FIGS. 3 and 4 in the unstressed condition. The leaf spring element 25 consists of a cylindrical, outwardly curved arcuate portion 29 which is adjoined on both sides by cylindrical, inwardly curved arcuate portions 30 and 31. The direction of the curvature thereby refers to the installed leaf spring elements 25 in relation to the center axis of the heat-exchanger disk 12. The radius of curvature and the sector angle, i.e., the angle between the radii of the inwardly curved arcuate portions 30 and 31 are respectively smaller than those of the outwardly directed arcuate portion 29.

An outwardly curved end portion 32 adjoins the inwardly curved arcuate portion 31 of the spring element 25, which facilitates a sliding movement in the circumferential direction between the arcuate portions 30 and 31 of two adjacent spring elements 25. Two sections starting from the axially parallel edge 33 of the end portion 32 which are bent off approximately at right angle toward the outside, form rectangular extensions 34. The other inwardly curved arcuate portion 30 is provided with two rectangular openings 35. The extent or dimension of the openings 35 in the axial direction is slightly larger than that of the extensions 34. The center distances of the extensions 34 and of the openings 35 from the lateral edges 36 of the leaf spring element 25 are identical.

In the installed condition of the leaf spring elements 25 arranged ring-shaped, as can be recognized from FIG. 2, the extensions 34 of a leaf spring element 25 engage respectively with play in the circumferential direction into the openings 35 of the adjacent leaf spring element 25. The convex sides 37 of the arcuate portions 30 provided with the openings 35 thereby abut at the concave sides 38 of the arcuate portions 31 provided with the extensions 34. The shape and configuration of the arcuate portions 30 and 31 and of the end portions 32 as well as the play between the extensions 34 and the openings 35 permit sufficient relative movement also during larger operationally conditioned elastic deformations of the leaf spring elements. The leaf spring elements 25 thereby support themselves with respect to one another against an axial displacement or offset as a result of the connection established by the extensions 34 and the openings 35 so that they are disposed always in a single plane independently of the elastic deformations.

The outwardly curved arcuate portions 29 of the leaf spring elements 25 are supported in recesses 39 of the otherwise cylindrical opening or aperture 28 within the massive core 19 of the heat-exchanger disk 12. The radius of curvature of each essentially cylindrically curved recess 39 is only slightly smaller than that of the prestressed outwardly curved arcuate portion 29 so that the latter follows the recess 39 and abuts thereat over a large area. As a result of the wide abutment area resulting therefrom, the surface stresses of the heat-exchanger disk 12 are considerably reduced and stress peaks which might lead to the damaging thereof are avoided.

The overlappinng inwardly curved arcuate portions 30 and 31 of the leaf spring elements 25 are supported on corresponding flattened portions 40 distributed over the circumference of the outer bearing race 26 of the roller bearing 20. Also, in this case a surface contact between the directly abutting arcuate portions 31 and the flattened surfaces 40 results from the abutment pressure of the prestressed spring elements 25.

With a rotating heat-exchanger disk 12, a wedging effect results between the flattened portions 40 of the outer bearing race 26 of the roller bearing 20 and the inwardly curved arcuate portions 30 and 31 supported thereat which assures a good centering of the heat-exchanger disk 12 and a reliable torque transmission.

It is possible to secure the leaf spring elements which are being held by their prestress and mutual support in the disk plane, additionally against an axial displacement of the entire leaf spring ring. This may take place, for example, by clips, tabs, or straps at the leaf spring elements which abut on both sides at the end faces of the heat-exchanger disk or at the support, or may take place by collars at the heat-exchanger disk or at the support. In the illustrated embodiment, this task can be assumed by collar sections which delimit one or all of the flattened portions 40 within the scope of the outer diameter of the outer bearing race 26. In lieu of providing three leaf springs as shown in the illustrated embodiment, also four or more leaf spring elements may be arranged in the annular space between the heat-exchanger disk and the support.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A heat-exchanger disk of a regenerative heat-exchanger, which is secured under interposition of spring means on a rotatable support means, characterized in that the spring means are formed by leaf spring elements arranged one adjacent the other in the shape of a ring which are connected with each other at their overlapping ends, the leaf spring elements being provided with outwardly curved arcuate portions and with inwardly curved arcuate portions and being supported under prestress with the outwardly curved arcuate portions thereof at counter surfaces provided in a central aperture of the heat-exchanger disk and with the inwardly curved arcuate portions at counter surfaces of the support means.

2. A heat-exchanger disk according to claim 1, characterized in that a respective leaf spring element includes an approximately cylindrical, outwardly curved arcuate portion in the unstressed condition which is adjoined on both sides thereof by approximately cylindrical, inwardly curved arcuate portions in the unstressed conditions which compared to the outwardly curved arcuate portion have a smaller radius of curvature and subtend a smaller sector angle.

3. A heat-exchanger disk according to claim 2, characterized by at least one outwardly directed extension at one inwardly curved arcuate portion of a respective leaf spring element and by at least one opening in the other inwardly curved arcuate portion thereof, into which engages the extension of the adjacent spring element.

4. A heat-exchanger disk according to claim 3, characterized in that the extension of the adjacent leaf spring element engages in the opening with clearance in the circumferential direction.

5. A heat-exchanger disk according to claim 4, characterized in that the one inwardly curved arcuate portion of a leaf spring element is provided with several outwardly directed extensions and the other inwardly curved arcuate portion thereof is provided with several openings.

6. A heat-exchanger disk according to claim 4, characterized in that the inwardly curved arcuate portion provided with the extension is delimited by an outwardly curved end portion.

7. A heat-exchanger disk according to claim 6, characterized in that each extension consists of an approximately rectangularly bent-off section of the end portion.

8. A heat-exchanger disk according to claim 7, characterized in that the outwardly curved arcuate portions of the leaf spring elements are supported in recessed provided in the central aperture which have a slightly smaller radius of curvature than the outwardly curved arcuate portions of the clamped-in leaf spring elements.

9. A heat-exchanger disk according to claim 8, characterized in that inwardly directed arcuate portions of the leaf spring elements are supported on flattened off portions of a substantially cylindrical support means.

10. A heat-exchanger disk according to claim 9, characterized in that support means is constructed as bearing race.

11. A heat-exchanger disk according to claim 10, characterized in that the one inwardy curved arcuate portion of a leaf spring element is provided with several outwardly directed extensions and the other inwardly curved arcuate portion thereof is provided with several openings.

12. A heat-exchanger disk according to claim 3, characterized in that the inwardly curved arcuate portion provided with the extension is delimited by an outwardly curved end portion.

13. A heat-exchanger disk according to claim 12, characterized in that each extension consists of an approximately rectangularly bent-off section of the end portion.

14. A heat-exchanger disk according to claim 2, characterized in that the outwardly curved arcuate portions of the leaf spring elements are supported in recesses provided in a central aperture which have a slightly smaller radius of curvature than the outwardly curved arcuate portions of the clamped-in leaf spring elements.

15. A heat-exchanger disk according to claim 2, characterized in that the inwardly directed arcuate portions of the leaf spring elements are supported on flattened off portions of a substantially cylindrical support means.

16. A heat-exchanger disk according to claim 15, characterized in that the outwardly curved arcuate portions of the leaf spring elements are supported in recesses provided in a central aperture which have a slightly smaller radius of curvature than the outwardly curved arcuate portions of the clamped-in leaf spring elements.

17. A heat-exchanger disk according to claim 1, characterized in that the support means is constructed as bearing race.

* * * * *